(12) United States Patent
Choukir et al.

(10) Patent No.: US 12,167,485 B2
(45) Date of Patent: Dec. 10, 2024

(54) APPLICATION SESSION PERSISTENCE ACROSS DYNAMIC MEDIA ACCESS CONTROL (MAC) ADDRESS ROTATIONS

(71) Applicant: Cisco Technology, Inc., San Jose, CA (US)

(72) Inventors: Amine Choukir, Ecublens VD (CH); Robert Barton, Richmond (CA); Anirban Karmakar, Ecublens Vaud (CH); Domenico Ficara, Vaud (CH); Vincent Cuissard, Eteaux (FR); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 355 days.

(21) Appl. No.: 17/673,334

(22) Filed: Feb. 16, 2022

(65) Prior Publication Data

US 2023/0262798 A1 Aug. 17, 2023

(51) Int. Cl.
*H04W 76/15* (2018.01)
*H04W 76/30* (2018.01)
*H04W 80/02* (2009.01)

(52) U.S. Cl.
CPC .......... *H04W 76/15* (2018.02); *H04W 76/30* (2018.02); *H04W 80/02* (2013.01)

(58) Field of Classification Search
CPC ..... H04W 76/15; H04W 76/30; H04W 80/02; H04W 12/02; H04L 69/14; H04L 61/5092
See application file for complete search history.

(56) References Cited

U.S. PATENT DOCUMENTS

| | | | |
|---|---|---|---|
| 9,264,353 B2 | 2/2016 | Krishnaswamy et al. | |
| 9,871,723 B2* | 1/2018 | Teyeb | H04W 40/34 |
| 10,757,146 B2 | 8/2020 | Annamalaisami et al. | |
| 11,063,639 B1 | 7/2021 | Legg et al. | |
| 2014/0064056 A1* | 3/2014 | Sakata | H04L 41/0816 370/216 |
| 2015/0281167 A1 | 10/2015 | Seddon | |
| 2016/0255551 A1* | 9/2016 | Susitaival | H04W 16/32 370/334 |
| 2017/0163539 A1 | 6/2017 | Sreeramoju et al. | |

(Continued)

OTHER PUBLICATIONS

International Preliminary Report on Patentability and Written Opinion in counterpart International Application No. PCT/US2023/012677, mailed Apr. 6, 2023, 13 pages.

(Continued)

*Primary Examiner* — Deepa Belur
(74) *Attorney, Agent, or Firm* — Edell, Shapiro & Finnan, LLC

(57) ABSTRACT

A user device connected to a wireless network maintains session persistence through a MAC address change of a user device. The user device establishes a multi-path communication session including a first subflow associated with a first MAC address for the user device. When the user device changes from the first MAC address to a second MAC address, the user device establishes a second subflow of the multi-path communication session. The second subflow is associated with the second MAC address. After establishing the second subflow associated with the second MAC address, the user device ends the first subflow associated with the first MAC address.

22 Claims, 12 Drawing Sheets

(56) References Cited

U.S. PATENT DOCUMENTS

| | | | |
|---|---|---|---|
| 2019/0150150 A1* | 5/2019 | Calin | H04W 72/0453 |
| | | | 370/329 |
| 2020/0229071 A1 | 7/2020 | Ansley et al. | |
| 2020/0344203 A1 | 10/2020 | Mermoud et al. | |
| 2020/0351648 A1 | 11/2020 | Fang | |
| 2022/0086627 A1* | 3/2022 | Montemurro | H04L 61/25 |
| 2022/0150303 A1* | 5/2022 | Quevedo | H04L 67/1038 |
| 2023/0144074 A1* | 5/2023 | Szilagyi | H04L 45/245 |
| | | | 370/235 |

OTHER PUBLICATIONS

Sangrok Han, et al., "Overcoming IP Communication Breakdown upon Pseudonym Changes in the IEEE Wave," IEEE, 2017 IEEE Vehicular Networking Conference (VNC), 2017, 4 pages.

A. Ford, et al., "TCP Extensions for Multipath Operation with Multiple Addresses," Internet Engineering Task Force (IETF), Request for Comments: 6824, Category: Experimental, ISSN: 2070-1721, Jan. 2013, 64 pages.

X. Wei, et al., "MPTCP proxy mechanisms draft-wei-mptcp-proxy-mechanism-02," Internet-Draft, Intended Status: Standards Track, Expires: Jan. 2, 2016, Jul. 1, 2015, 11 pages.

C. Wood et al., "Linkable Identifiers", draft-wood-linkable-identifiers-01, Network Working Group, Apr. 24, 2019, 9 pages.

A. Ford et al., "TCP Extensions for Multipath Operation with Multiple Addresses", Internet Engineering Task Force (IETF), Request for Comments: 6824, ISSN: 2070-1721, Jan. 2013, 64 pages.

J. Henry et al., "Randomized and Changing MAC Address Use Cases", draft-henry-madinas-framework-03, Internet Engineering Task Force, Oct. 24, 2021, 15 pages.

* cited by examiner

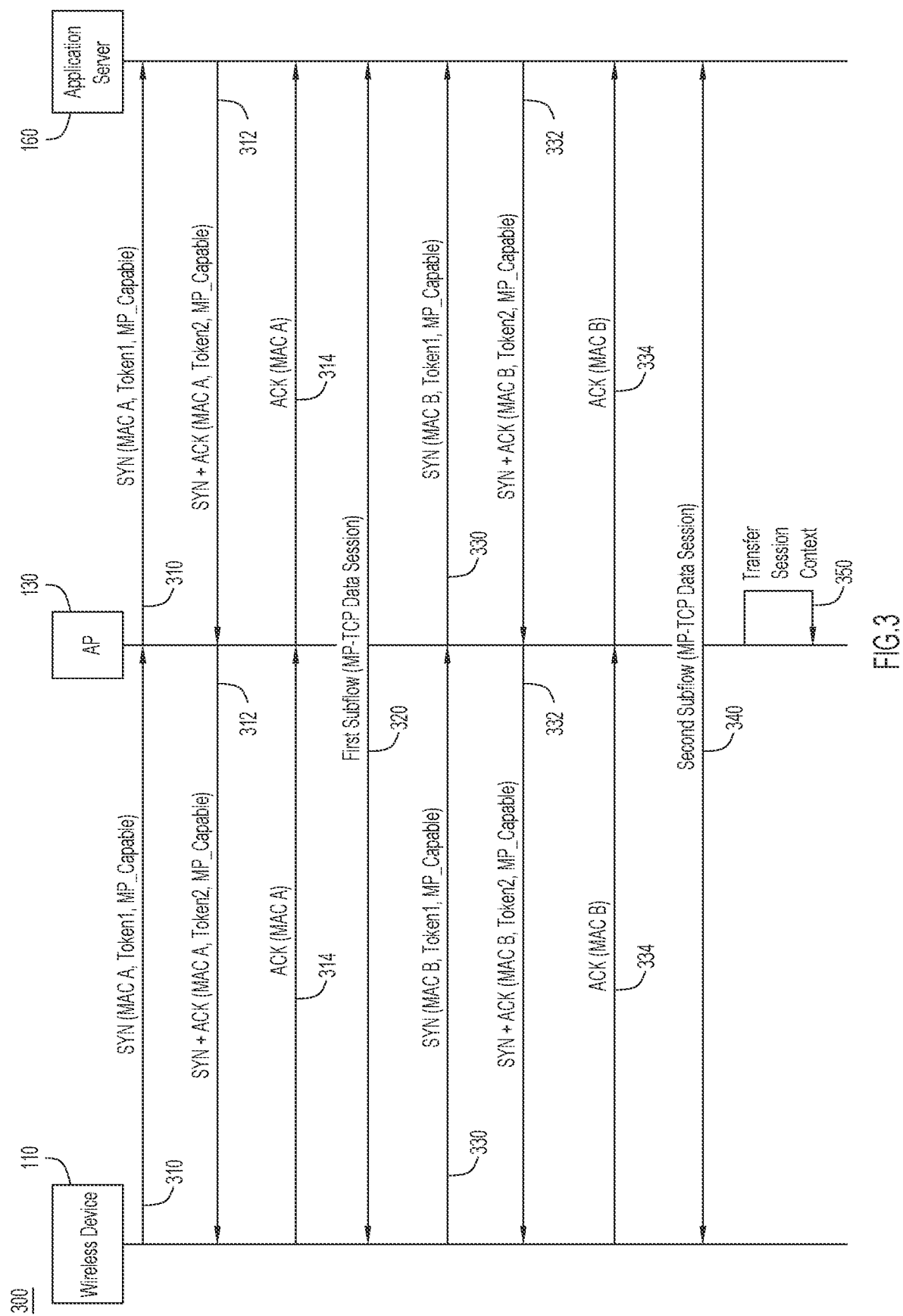

APPLICATION SESSION PERSISTENCE ACROSS DYNAMIC MEDIA ACCESS CONTROL (MAC) ADDRESS ROTATIONS

TECHNICAL FIELD

The present disclosure relates to wireless networking.

BACKGROUND

Wireless devices associate to wireless access points of a wireless network to gain access to the network infrastructure. In some wireless networks, wireless devices gain access to the network infrastructure through different access points that are coordinated by a network controller. The wireless devices and network infrastructure typically use Media Access Control (MAC) hardware addresses to direct network messages (e.g., frames) to the proper devices.

Some wireless devices may use a random or rotating MAC address to account for issues of privacy and tracking the wireless device. Changing MAC addresses provides an opportunity for two devices on the network to randomly choose the same MAC address, resulting in a MAC collision that prevents proper network communications. If a MAC collision occurs with a critical application or infrastructure, the wireless devices with the same MAC address are no longer able to communicate correctly in the network.

Multi-homed transport protocols, such as Quick User Data Protocol (UDP) Internet Connection (QUIC), Stream Control Transmission Protocol (SCTP), or Multi-Path Transport Control Protocol (MP-TCP), were created to increase the reliable delivery of packets across multiple network paths. For instance, a user device may maintain reliable transmission of service requests and responses when moving between a local network (e.g., a home Wi-Fi® wireless local area network) to a wider area network (e.g., 4G/5G wireless wide area networks) through multi-homed transport protocols.

BRIEF DESCRIPTION OF THE DRAWINGS

FIG. 3 is a message flow diagram illustrating the transfer of a session context for a wireless device after a MAC address change, according to an example embodiment.

DESCRIPTION OF EXAMPLE EMBODIMENTS

Overview

Briefly, in one embodiment, a method is provided for maintaining session persistence through a MAC address change of a user device connected to a wireless network. The method includes establishing a multi-path communication session including at least one first subflow associated with a first MAC address for the user device. The method also includes determining that the user device changes from the first MAC address to a second MAC address and establishes at least one second subflow of the multi-path communication session. The second subflow is associated with the second MAC address. After establishing the at least one second subflow associated with the second MAC address, the method includes ending or terminating the at least one first subflow associated with the first MAC address.

Example Embodiments

As wireless clients or user devices rotate Media Access Control (MAC) addresses, they may temporarily lose connections to the network. If the client is communicating during the MAC address rotation, the application may lose connectivity and may have to re-establish the connection, which may greatly slow down the connection. As the MAC address rotates, the techniques presented herein are directed toward maintaining session persistence during a MAC address rotation, enabling applications to continue to function as expected.

In one example embodiment, the techniques presented herein enable a wireless device to maintain a persistent connection to a wireless network through a MAC address rotation by associating each new MAC address in the MAC address rotation with a new subflow in a multi-path session. The wireless device may start a MAC address rotation by associating to an Access Point (AP) of the wireless network and obtaining a new Internet Protocol (IP) address for the new subflow. The wireless device may then create a new subflow of the multi-path session (e.g., a QUIC, SCTP, or MP-TCP session). Once the wireless device establishes the new subflow with the wireless network using the new MAC address, the old subflow associated with the previous MAC address may be abandoned (terminated) in a make-before-break approach. The application traffic may continue throughout the MAC address rotation using the multi-path protocol. The wireless network infrastructure may use transport protocol identifiers (e.g., session and subflow identifiers) to follow the wireless device session.

Figure 1:
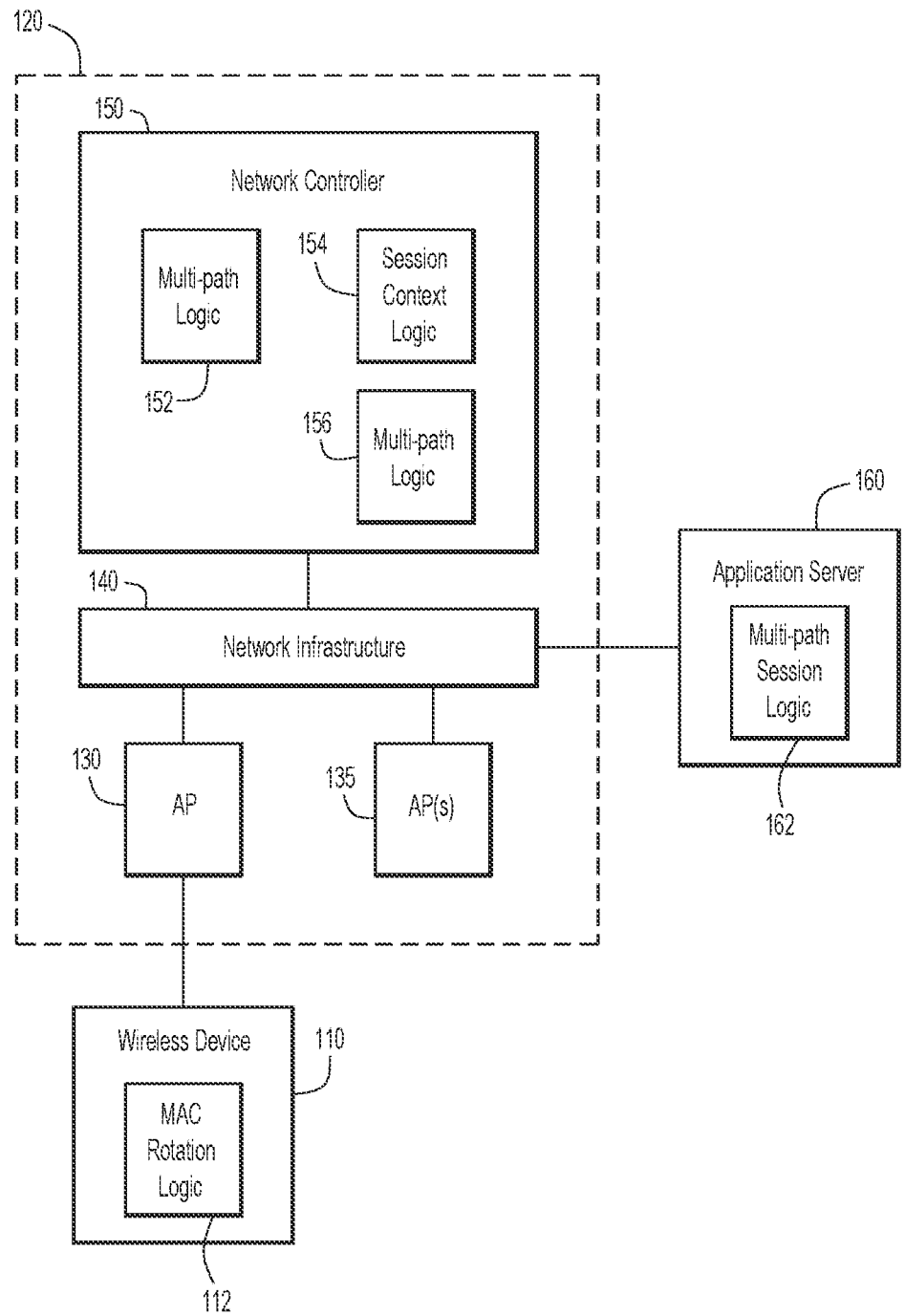
FIG. 1 is a simplified block diagram of a wireless network system configured to leverage multi-path transport protocol messages for session persistence across MAC address changes, according to an example embodiment.

Referring now to FIG. 1, a simplified block diagram illustrates a system for maintaining session persistence when a wireless device 110 changes MAC addresses. The wireless device 110 includes MAC rotation logic 112 that enables the wireless device 110 to change MAC address, e.g., for privacy/security concerns. In one example, the MAC rotation logic 112 periodically changes the MAC address of the wireless device 110 to a pseudorandom address.

The wireless device 110 connects to the wireless network 120 through an AP 130. The wireless network 120 includes one or more additional APs 135, which may be used by the wireless device 110 or other wireless devices to connect to the wireless network 120. The wireless network 120 also includes network infrastructure 140 comprising one or more network elements (e.g., switches, routers, gateways, servers, etc.) that are configured to carry data from wireless devices (e.g., wireless device 110) to external endpoints and/or networks. The network infrastructure 140 may include the APs 130 and 135 as network elements of the network infrastructure 140.

Figure 7:
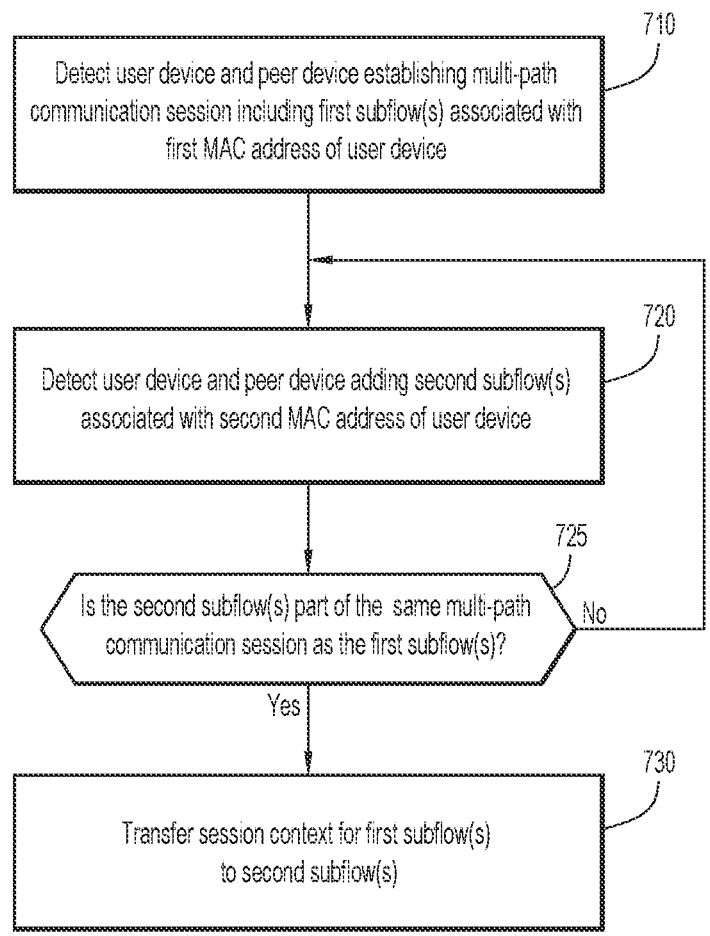
FIG. 7 is a flowchart illustrating operations performed by a wireless network element to transfer a session context for a user device after a MAC address change, according to an example embodiment.

The wireless network 120 is controlled by a network controller 150, which includes or executes multi-path logic 152, session context logic 154, and multi-path proxy logic 156. The multi-path logic 152 enables the controller 150 to direct traffic through the network infrastructure 140 according to multi-path messaging protocols (e.g., MP-TCP, SCTP, QUIC, etc.). The session context logic 154 enables the controller 150 to transfer the session context for wireless devices (e.g., wireless device 110), as described hereinafter with respect to FIG. 3 and FIG. 7. The multi-path proxy logic 156 enables the controller 150 to direct elements of the network infrastructure 140 to generate a proxy multi-path data session for endpoints that are not multi-path capable, as described hereinafter with respect to FIG. 4 and FIG. 8.

The network infrastructure 140 also connects the wireless network 120 to an application server 160. The application server 160 communicates with the wireless device 110 through the wireless network 120 and is also described herein as a peer device to the wireless device 110. The application server 160 may include multi-path session logic 162 that enables the application server 160 to communicate with the wireless device 110 using multi-path messaging protocols.

Figure 2A:
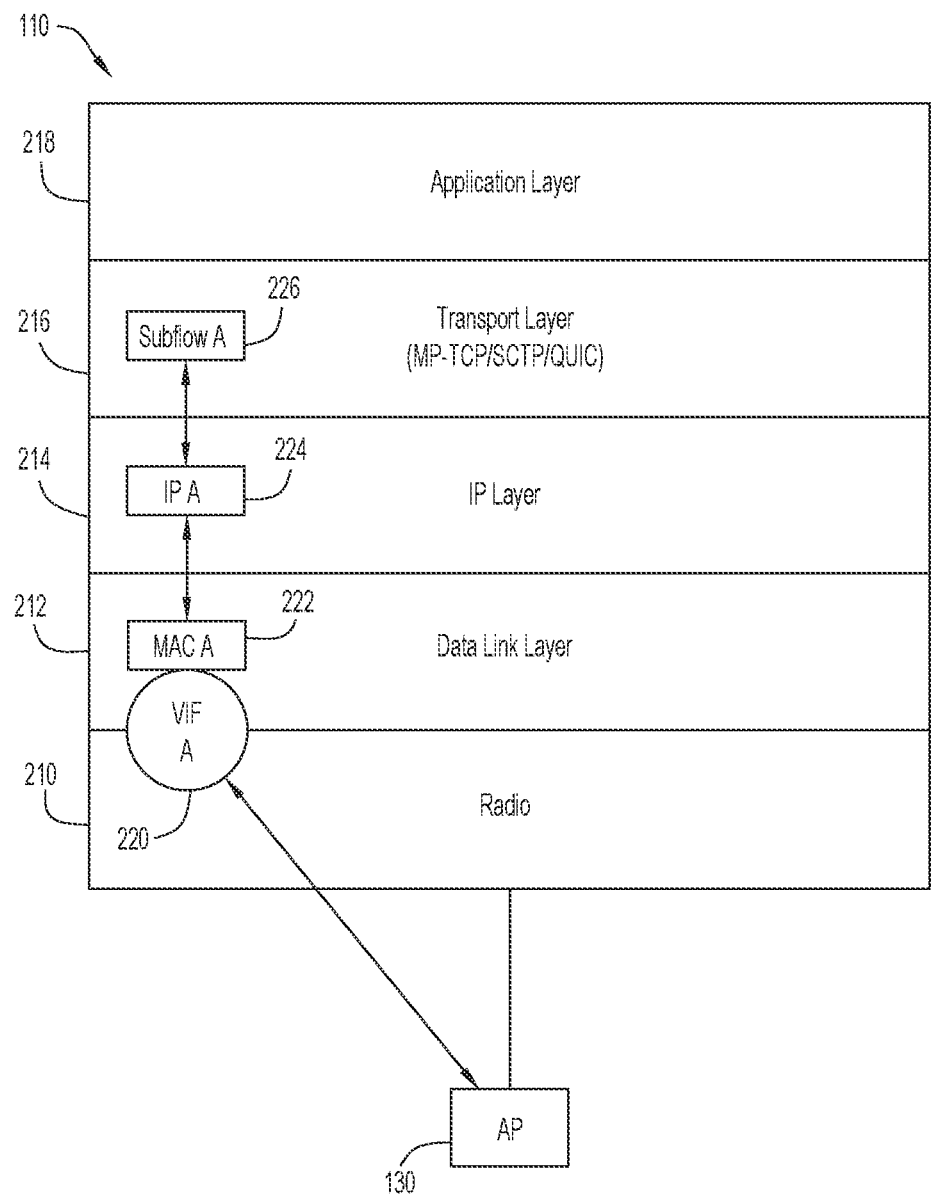
FIGS. 2A-2C are block diagrams illustrating a wireless device maintaining a data session through a MAC address change, according to an example embodiment.
Figure 2B:
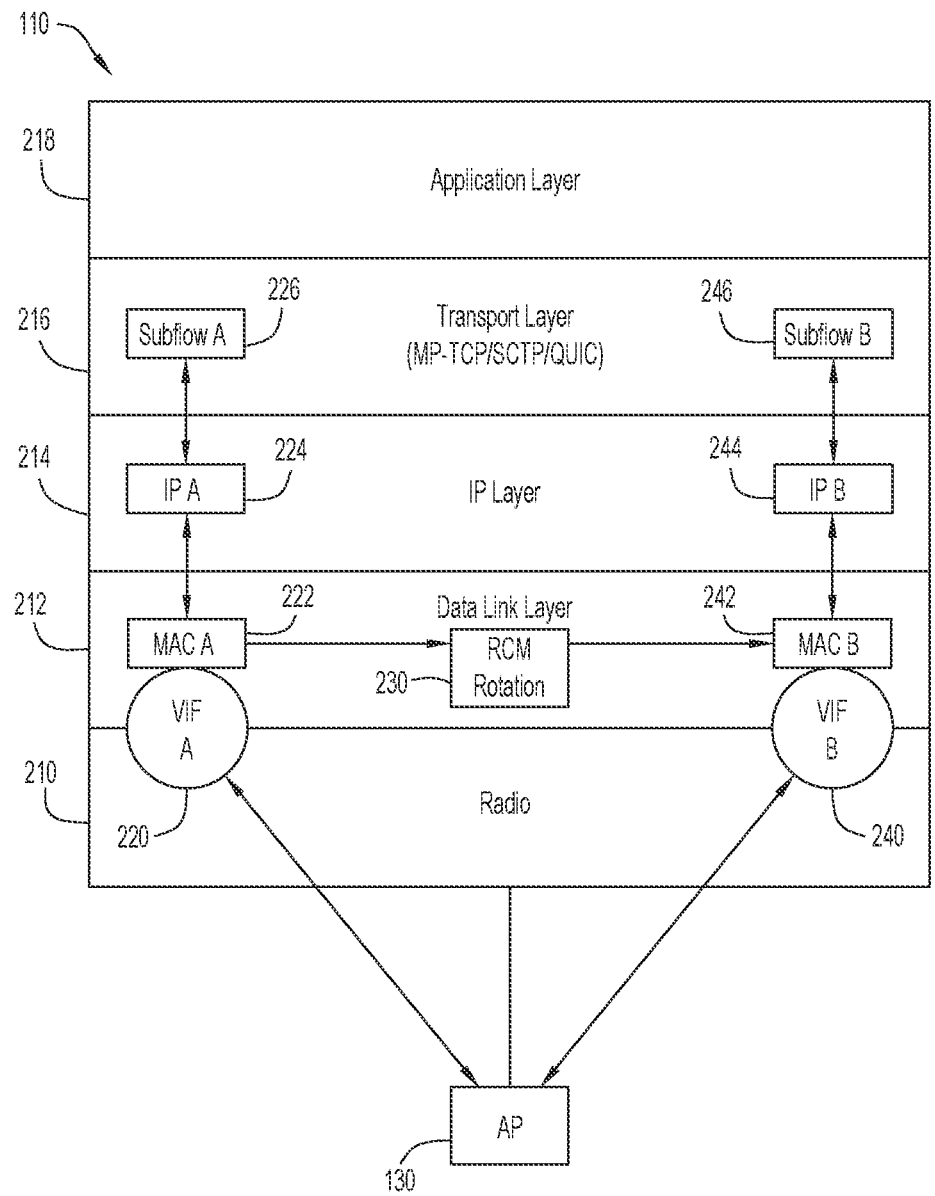
Figure 2C:
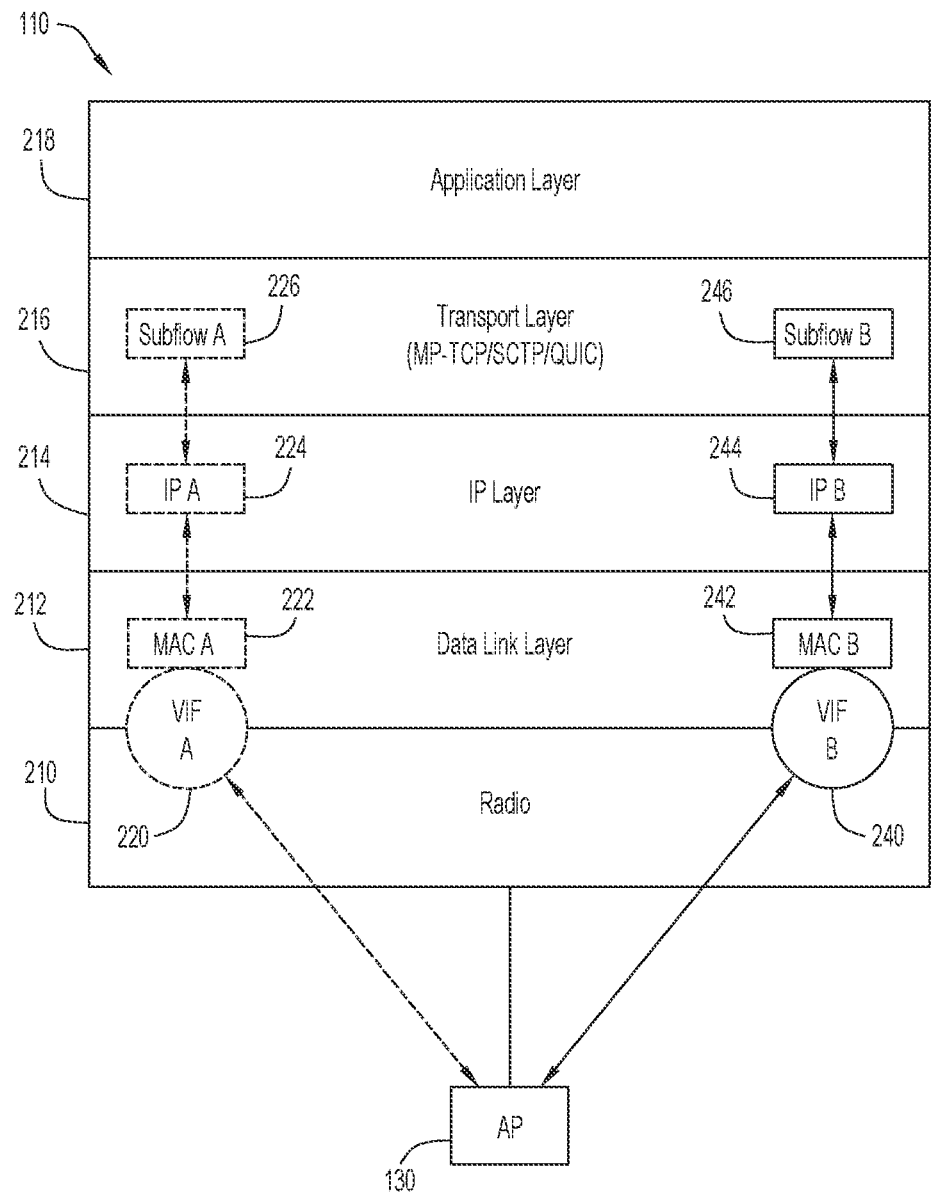

Referring now to FIG. 2A, FIG. 2B, and FIG. 2C, block diagrams illustrates the wireless device 110 maintaining a data session with the AP 130 through a MAC address rotation. The wireless device 110 includes an Operating System stack with layers that represent messaging levels for the wireless device 110 to communicate with other computing devices. The stack includes a radio layer 210 (e.g., Open System Interconnection (OSI) Layer 1), a data link layer 212 (e.g., OSI Layer 2), an IP layer 214 (e.g., OSI Layer 3), a transport layer 216 (e.g., OSI Layer 4), and an application layer 218 (e.g., OSI Layer 7). The wireless device 110 may use other messaging levels (e.g., OSI Layers 5 and 6), which are not affected by the techniques described herein.

Specifically with respect to FIG. 2A, the wireless device 110 includes a Virtual Interface (VIF) 220 (e.g., VIF A) to the radio layer 210. The VIF 220 is associated with a MAC address 222 (e.g., MAC A) at the data link layer 212. Associated with the MAC address 222, the wireless device 110 obtains an IP address 224 (e.g., IP A) at the IP layer 214 and starts a multi-path data session with subflow 226 (e.g., subflow A) at the transport layer 216. The wireless device 110 associates the subflow 226, the IP address 224, and the MAC address 222 with the VIF 220 that communicates with the AP 130.

In one example, the wireless device 110 generates a random number or a pseudorandom number for use as the MAC address 222. The wireless device 110 may obtain the IP address 224 through an automatic address allocation mechanism (e.g., Dynamic Host Configuration Protocol (DHCP) or StateLess Address Auto Configuration (SLAAC)). The wireless device 110 may set up the subflow 226 using MP-TCP, SCTP, or QUIC message exchanges with a peer device.

When the wireless device 110 changes its MAC address, such as with a Randomized and Changing MAC (RCM) rotation event 230, the wireless device 110 generates a VIF 240 (e.g., VIF B) based on the new MAC address 242 (e.g., MAC B). The VIF 240 associates with the AP 130 using the MAC address 242. Alternatively, the VIF 240 may associate with a different AP (e.g., AP 135 shown in FIG. 1) of the wireless network 120. For instance, the association between the VIF 240 and a different AP may be performed through channel switching, a second radio on the wireless device 110, or association to the new AP through the AP 130.

The stack of the wireless device 110 detects the VIF 240 and obtains a corresponding IP address 244 (e.g., IP B) and adds a new subflow 246 (e.g., subflow B) to the multi-path data session. In one example, the transport layer 216 is configured to automatically leverage any available interface (e.g., VIF 220 and VIF 240) with a properly allocated network address (e.g., IP address 224 and IP address 244).

Once the wireless device 110 is communicating through the subflow 246 associated with the new MAC address 242, the previous VIF 220, MAC address 222, IP address 224, and subflow 226 may be ended, as shown in FIG. 2C. In one example, the elements associated with the original MAC address 222 (i.e., VIF 220, IP address 224, and subflow 226) may be discarded after a predetermined amount of time based on a timeout value. In other words, a timer may be started after generating the new VIF (e.g., VIF 240), and the old VIF (e.g., VIF 220), old MAC address (e.g., MAC address 222), old IP address (e.g., IP address 224), and the old subflow (e.g., subflow 226) may be discarded when the timer expires. Alternatively, the wireless device 110 may coordinate across stack layers (e.g., layers 210-216) to determine that the new IP address 244 has been obtained for the new VIF 240, and that the corresponding subflow 246 has been created, before signaling to the data link layer 212 that the old VIF 220 may be safely discarded.

Referring now to FIG. 3, a message flow diagram 300 shows one example of the network infrastructure (e.g., the AP 130) tracking MP-TCP connections through a MAC address change (e.g., an RCM rotation). The messages in the message flow diagram 300 are specific to the MP-TCP format, but other formats for multi-path sessions may have similar messages that identify subflows as part of the same multi-path session. To initiate an MP-TCP session between the wireless device 110 and an application server 160, the wireless device 110 sends a synchronization request (SYN) packet 310 to the AP 130, which forwards the SYN packet 310 to the application server 160 through the network infrastructure (not shown). In one example, the SYN packet 310 identifies the MAC address of the wireless device (e.g., MAC A), provides a token (e.g., Token 1) identifying the multi-path session from the wireless device 110 to the application server 160, and includes an indication that the wireless device 110 is multi-path capable.

In response to the SYN packet 310, the application server 160 sends a synchronization/acknowledgement (SYN+ACK) packet 312 to the wireless device 110 through the network infrastructure and AP 130. The SYN+ACK packet 312 identifies the MAC address of the wireless device (e.g., MAC A), provides a token (e.g., Token 2) identifying the reverse connection from the application server 160 to the wireless device 110, and includes an indication that the application server 160 is multi-path capable. The wireless device 110 completes the handshake for the subflows in the multi-path session by sending an acknowledgement (ACK) packet 314 to the application server 160 through the AP 130 and the network infrastructure. Once the handshake is complete, the wireless device 110 and the application server 160 may communicate in a first subflow 320 of an MP-TCP data session.

If the MAC address of the wireless device 110 changes (e.g., through an RCM rotation event), then the wireless device 110 adds a second subflow to the MP-TCP connection by sending a SYN packet 330. The SYN packet 330 identifies the new MAC address (e.g., MAC B) of the wireless device. The SYN packet 330 also indicates that the wireless device is multi-path capable and includes the same token (e.g., Token 1) from the SYN packet 310 to indicate that the second subflow is part of the same MP-TCP session. The application server 160 responds with a SYN+ACK packet 332 identifying the new MAC address (e.g., MAC B). The SYN+ACK packet 332 also indicates the application server 160 is multi-path capable and includes the same token (e.g., Token 2) from the SYN+ACK packet 312 to indicate that the second subflow is part of the same MP-TCP session. The wireless device 110 completes the handshake for the second subflow by returning an ACK packet 334. Once the handshake is complete, the wireless device 110 and the application server 160 may communicate in a second subflow 340 of the same MP-TCP data session.

The wireless network infrastructure and controller are part of the Layer 2 access network through the AP 130 and may observe the MP-TCP handshakes between the wireless device 110 and the application server 160. The visibility into the MP-TCP handshakes for the subflows associated with both MAC addresses enables elements of the wireless network (e.g., AP 130 and the network controller) to transfer the session context 350 from the first subflow to the second subflow. Transferring the session context in the wireless network enables each network element to service the first subflow 320 and the second subflow 340 with the security and policies.

Figure 4:
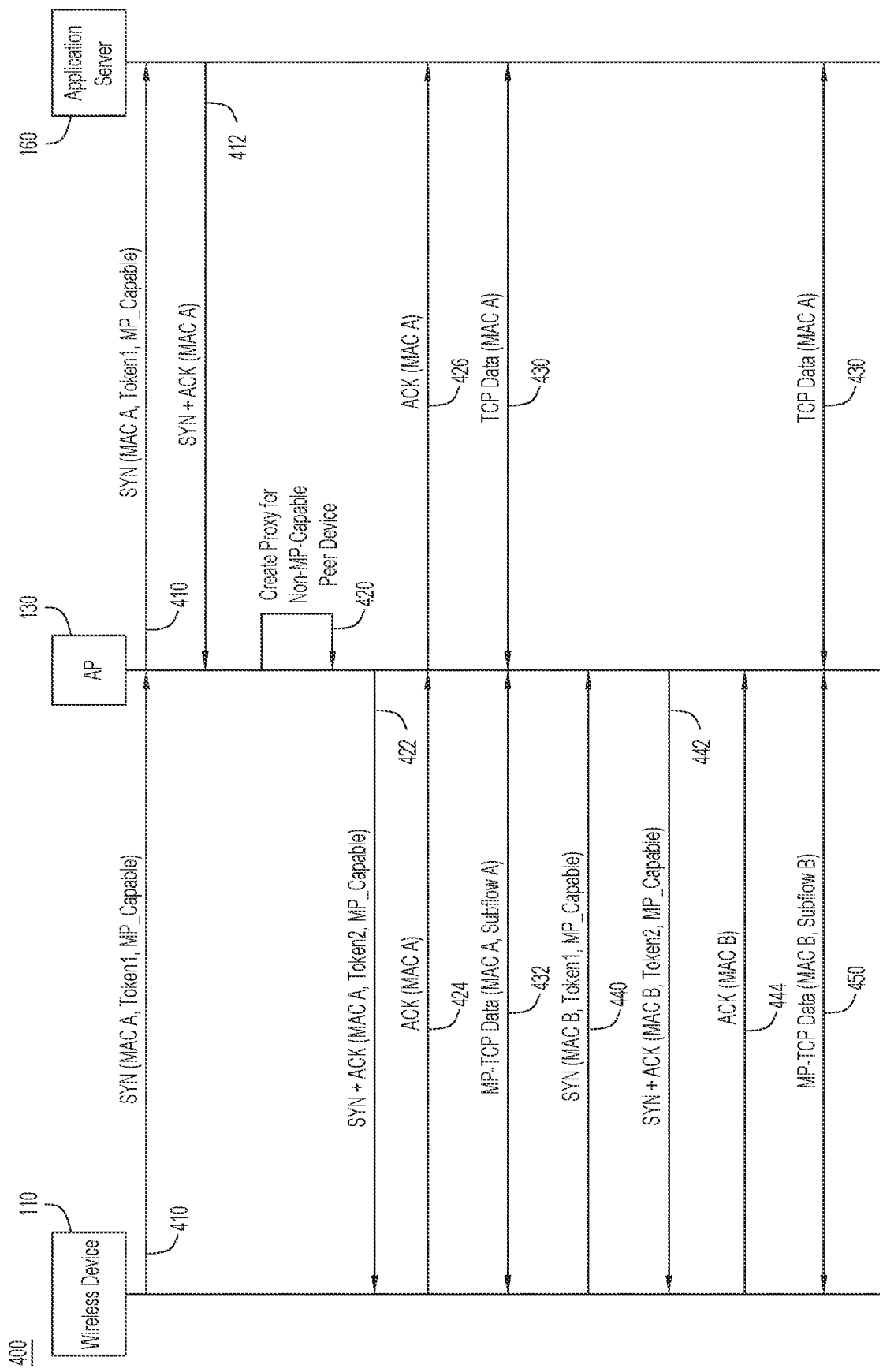
FIG. 4 is a message flow diagram illustrating a wireless network proxying multi-path capability for an application server that is not multi-path capable, according to an example embodiment.

Referring now to FIG. 4, a message flow diagram 400 shows one example of the network infrastructure (e.g., the AP 130) transparently providing an MP-TCP proxy service for an application server 160 that is not multi-path capable and allow session persistence through an RCM rotation. The wireless device initiates a first subflow with a SYN packet 410 that identifies the current MAC address (e.g., MAC A) of the wireless device 110. The SYN packet 410 also indicates that the wireless device 110 is multi-path capable and provides a token (e.g., Token 1) to identify an MP-TCP session. The AP 130 forwards the SYN packet 410 through the network infrastructure (not shown) to the application server 160.

In this example, the application server 160 does not have the capability to process multi-path communication and responds to the SYN packet 410 with a SYN+ACK packet 412 that identifies the MAC address of the wireless device 110, but does not indicate that the application server 160 is multi-path capable. The network controller detects that the application server 160 responds to the multi-path capable SYN packet 410 with a non-multi-path capable SYN+ACK packet 412, and directs the AP 130 to create a multi-path proxy at 420 for the application server 160. Alternatively, the controller may direct one or more different network elements in the wireless network to create and maintain the multi-path proxy. In other words, the wireless network snoops on the TCP handshake between the peer devices (e.g., the wireless device 110 and the application server 160) and, upon detecting that one of the peer devices is not multi-path capable, interposes as a proxy to facilitate session persistence through a change in MAC address as described herein.

As the multi-path proxy for the application server 160, the AP 130 sends a SYN+ACK packet 422 to the wireless device 110. The SYN+ACK packet 422 identifies the MAC address of the wireless device 110, indicates a multi-path capable host, and provides a token (e.g., Token 2) to identify the MP-TCP session from the proxy host at the AP 130 to the wireless device 110. In response to the SYN+ACK packet 422 form the AP 130, the wireless device 110 completes the MP-TCP handshake by sending an ACK packet 424 to the AP 130. The proxy host at the AP 130 completes the handshake with the application server 160 by sending an ACK packet 426 to the application server 160.

Once the handshake is complete, the application server 160 communicates with the proxy at the AP 130 with a single path TCP data session 430. The proxy at the AP 130 converts the TCP data session 430 into a subflow (e.g., subflow A) of an MP-TCP data session 432 that is associated with the current MAC address (e.g., MAC A) of the wireless device 110. If the wireless device 110 changes MAC address (e.g., through an RCM rotation to MAC B), then the wireless device 110 initiates another MP-TCP handshake to add a second subflow to the MP-TCP data session. The MP-TCP handshake starts with a SYN packet 440 indicating the new MAC address. The SYN packet 440 also includes a multi-path indication and the same token (e.g., Token 1) used in the SYN packet 410 establishing the first subflow.

The proxy at the AP 130 directly responds to the SYN packet 440 with a SYN+ACK packet 442 that includes the same token (e.g., Token 2) used to respond in the SYN+ACK packet 422 for the first subflow. The wireless device 110 completes the second MP-TCP handshake by sending an ACK packet 444 to the proxy at the AP 130 to establish the second subflow in the MP-TCP session between the wireless device 110 and the proxy at the AP 130.

With the second subflow established between the wireless device 110 and the proxy at the AP 130, the proxy selects the second subflow (e.g., subflow B) of the MP-TCP data session 450 to provide to the application server 160 in the TCP data session 430. In one example, the proxy may buffer data from the TCP data session 430 while the second subflow is established between the AP 130 and the wireless device 110. The proxy at the AP 130 may provide any buffered data to the wireless device 110 through the second subflow once the second subflow is established.

Figure 5:
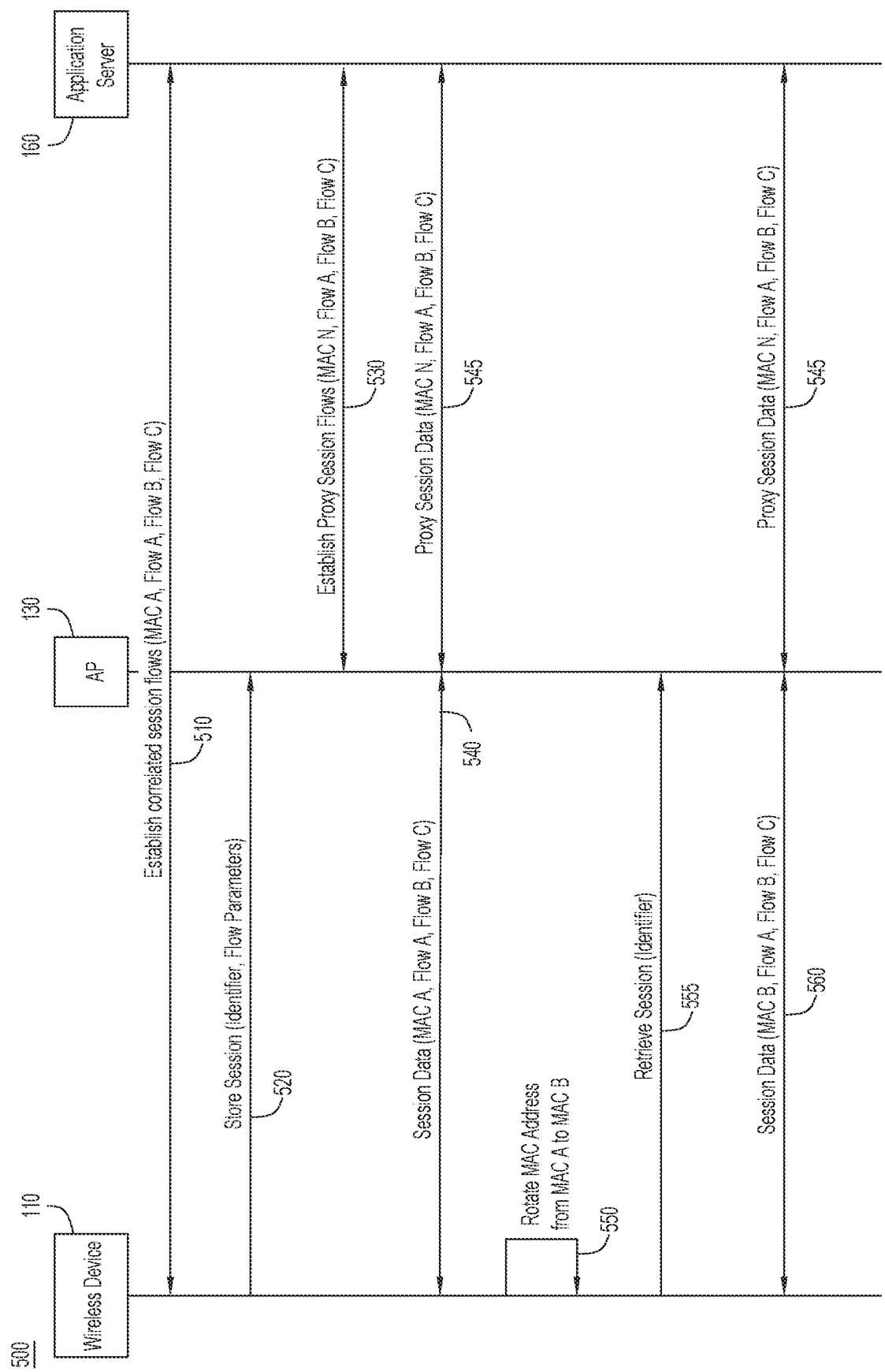
FIG. 5 is a message flow diagram illustrating the use of an identifier to resume correlated data flows after a MAC address change, according to an example embodiment.

Referring now to FIG. 5, a message flow diagram 500 shows one example of the network infrastructure re-establishing a plurality of correlated session flows after an RCM rotation event. The wireless device 110 and the application server 160 establish a plurality of correlated session flows 510 (e.g., flow A, flow B, flow C). In one example, the correlated session flows 510 may be different aspects of a collaboration session, such as a flow for audio data, a flow for video data, a flow for data from a shared whiteboard, and/or a flow for text messaging.

Once the plurality of correlated session flows are established, the wireless device 110 provides a message 520 to the AP 130 that includes a session identifier (e.g., a cookie, nonce, or other key) and flow parameters (e.g., policy/network settings) of the correlated flows. The AP 130, or another element of the network infrastructure directed by the network controller, establishes proxy session flows 530 for each of the flows identified in the message 520. In one example, the AP 130 establishes the proxy data sessions with a MAC address (e.g., MAC N) assigned to the AP 130. The AP 130 forwards the session data 540 (e.g., flows A-C) from the wireless device 110 and the proxy session data 545 (e.g., flows A-C) from the application server 160.

When the wireless device 110 changes MAC addresses at 550 (e.g., through an RCM rotation), the wireless device 110 sends a request 555 to retrieve the session with the correlated flows. In one example, the request 555 includes the session identifier to signal the AP 130 to resume all of the correlated flows associated with the session identifier. The AP 130 resumes the correlated data flows (e.g., flows A-C) by sending session data 560 that was obtained from proxy session data 545. In one example, the AP 130 may buffer the proxy session data 545 during the change of MAC address.

In one example, the AP 130 and/or another element in the network includes a "key-value" store configured to store the session identifiers and network flow parameters. The stored "key-value" may include the session identifier used by the application server 160, the network flow parameters of the correlated flows, and/or a secure nonce/key/cookie that is different from the session identifier used by the application server. Once the wireless device 110 provides the "key-value" to the network through the AP 130, the network controller starts a proxy for the correlated flows and stitches the device legs (e.g., session data 540) of the connection with the server legs (e.g., proxy session data 545) of the connection. After a change in MAC address for the wireless device, the device legs (e.g., session data 560) are refreshed and re-established. When connecting after a change of MAC address, by using the "key-value", the wireless device 110 obtains a valid set of correlated flows right away, using the same network policies applied to the original session.

The message flow diagram 500 illustrates an efficient alternative to resilient applications that monitor all of the correlated flows and individually re-establish the necessary flows upon loss of network connectivity. The resilient applications typically use a session identifier to identify the session across the plurality of correlated flows to ensure that the same network policies are applied to each of the correlated flows.

Figure 6:
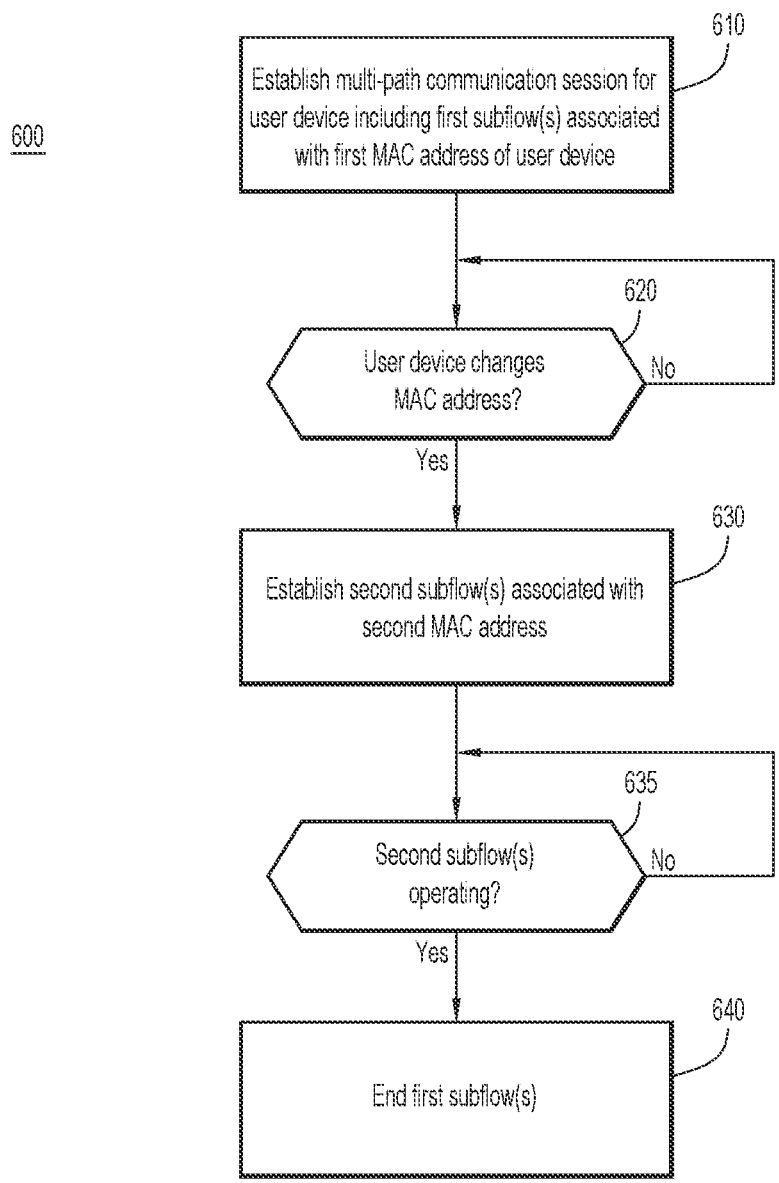
FIG. 6 is a flowchart illustrating operations performed by a user device to maintain session persistence through a MAC address change, according to an example embodiment.

Referring now to FIG. 6, a flowchart illustrates an example process 600 performed by a user device (e.g., wireless device 110) to maintain a data session through a change in MAC address by using multi-path subflows in a make-before-break transition. At 610, the user device establishes a first subflow of a multi-path communication session on a wireless network. The first subflow of the multi-path communication session is associated with a first MAC address of the user device. In one example, the user device establishes the first subflow with an MP-TCP handshake establishing the multi-path communication session. Until the user device changes MAC addresses from the first MAC address, the user device communicates with the wireless network through the first subflow.

Once the user device changes MAC address to a second MAC address, as determined at 620, the user device establishes a second subflow of the multi-path communication session at 630. The second subflow is associated with the second MAC address. In one example, the user device establishes the second subflow with an MP-TCP handshake adding the second subflow to the multi-path communication session. In another example, the user device may establish the second subflow with a different AP than the AP used for the first subflow.

Once the second subflow is operating, as determined at 635, the user device ends the first subflow at 640. In one example, the first subflow ends after the expiration of a timer with a predetermined length of time sufficient to establish the second subflow. Alternatively, the user device may affirmatively determine that the second subflow is establish and able to communicate in the multi-path communication session before dropping the first subflow. For instance, the user device may maintain Referring now to FIG. 7, a flowchart illustrates an example process 700 performed by at least one network element (e.g., network controller 150, AP 130, and/or an element of network infrastructure 140) to transfer a session context for a user device that changes MAC addresses. At 710, the network element detects that the user device and a peer device (e.g., application server 160) established a multi-path communication session including at least one first subflow associated with a first MAC address of the user device. In one example, the network element may detect a multi-path protocol handshake establishing the multi-path communication session with the first subflow.

At 720, the network element detects that the user device and the peer device have added at least one second subflow associated with a second MAC address to the multi-path communication session. In one example, the network element detects a multi-path protocol handshake adding the second subflow to the multi-path communication session. If the second subflow is part of the same multi-path communication session as the first subflow, as determined at 725, then the network element transfers the session context for the first subflow to the second subflow at 730. In one example, the network element may detect that the second subflow is part of the same multi-path communication session as the first subflow by determining that the handshake establishing the second subflow uses the same token as the handshake establishing the first subflow.

Figure 8:
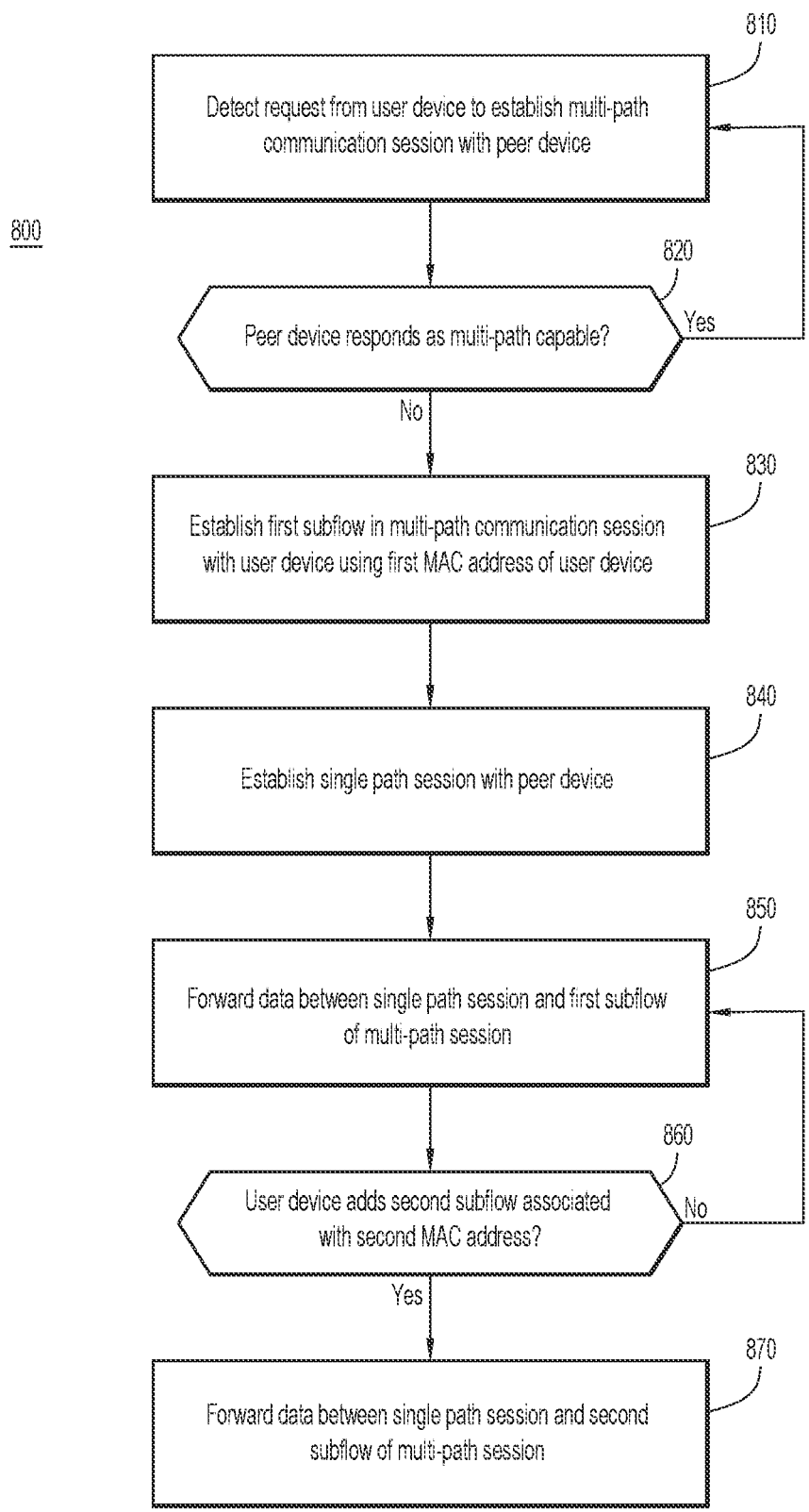
FIG. 8 is a flowchart illustrating operations performed by a wireless network element to proxy a multi-path session for a peer device that is not multi-path capable and enable session persistence through a MAC address change, according to an example embodiment.

Referring now to FIG. 8, a flowchart illustrates an example process 800 performed by at least one network element (e.g., network controller 150, AP 130, and/or an element of network infrastructure 140) to facilitate session persistence through a MAC address change by proxying a multi-path communication session for a peer device that is not multi-path capable. At 810, the network element detects a request from a user device to establish a multi-path communication session with a peer device (e.g., application server 160). In one example, the network element detects an MP-TCP SYN packet that indicates support for multi-path sessions. If the network element detects that the response from the peer device indicates the peer device is multi-path capable, as determined at 820, then the network element does not need to proxy the multi-path capability and returns to 810.

If the network element detects that the response from the peer device indicates that the peer device is not multi-path capable, as determined at 820, then the network element establishes a first subflow in a multi-path communication session with the user device associated with a first MAC address at 830. In one example, the network element may detect that the peer device is not multi-path capable by detecting a SYN+ACK packet that does not indicate support for multi-path sessions. In another example, the network element may establish the first subflow with the user device by responding with a SYN+ACK packet that does indicate support for multi-path sessions, and completing the handshake with the user device.

At 840, the network element establishes a single path session with the peer device. In one example, the network element receives an ACK packet from the user device and forwards the ACK packet to the peer device to establish a TCP session with the peer device. At 850, the network element forwards data between the single path session with the peer device and the first subflow of the multi-path communication session with the user device.

As long as the user device maintain the first subflow associated with the first MAC address, as determined at 860, the network device continues to stitch data from the single path session with the peer device with data from the first subflow of the multi-path communication session with the user device. If the user device adds a second subflow associated with a second MAC address to the multi-path communication session, as determined at 860, then the network element determines that the user device has changed MAC addresses (e.g., through an RCM rotation to the second MAC address). At 870, the network element will begin to forward data between the single path session and the second subflow associated with the second MAC address.

Figure 9:
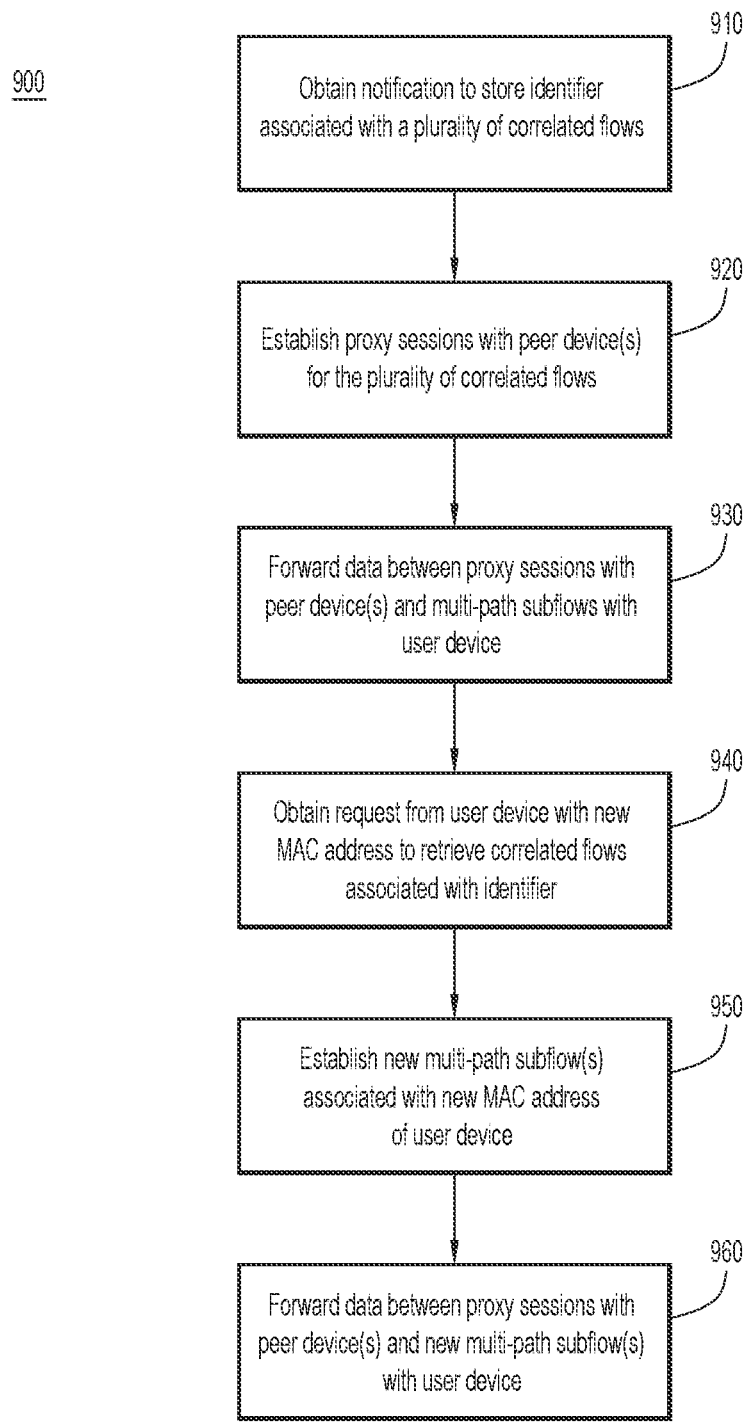
FIG. 9 is a flowchart illustrating operations performed by a wireless network element to resume correlated data flows after a MAC address change, according to an example embodiment.

Referring now to FIG. 9, a flowchart illustrates an example process 900 performed by at least one network element (e.g., network controller 150, AP 130, and/or an element of network infrastructure 140) to extend the multi-path session persistence to a plurality of correlated flows through a MAC address change. At 910, the network element obtains a notification to store an identifier associated with a plurality of correlated flows between a user device and at least one peer device. In one example, the correlated flows may be audio data flows, video data flows, text data flows, or other modes of communication in a collaboration session. In another example, the network element may receive the notification with the identifier from the user device or from the peer device. In another example, the identifier may include a session identifier, network parameters, and a secure identifier (e.g., a nonce, key, or random cookie).

At 920, the network element establishes proxy sessions with the peer device for each of the plurality of correlated flows. The network element forwards data between the proxy sessions with the peer device and the session with the user device at 930. In one example, the session with the user device may comprise one or more subflows of a multi-path communication session.

At 940, the network element obtains a request from the user device to retrieve the correlated flows associated with an identifier provided within the request. In one example, the user device has changed MAC address (e.g., through an RCM rotation) to a second MAC address that is different from the first MAC address originally associated with the user device. At 950, the network element establishes at least one new subflow in the multi-path communication session with the user device. The new subflow is associated with the new MAC address of the user device. In one example, the network element may buffer the data from the proxy sessions of the correlated flows while the new subflow is established with the user device. At 960, the network element forwards data between the proxy sessions of the correlated flows with the new multi-path subflow with the user device.

Figure 10:
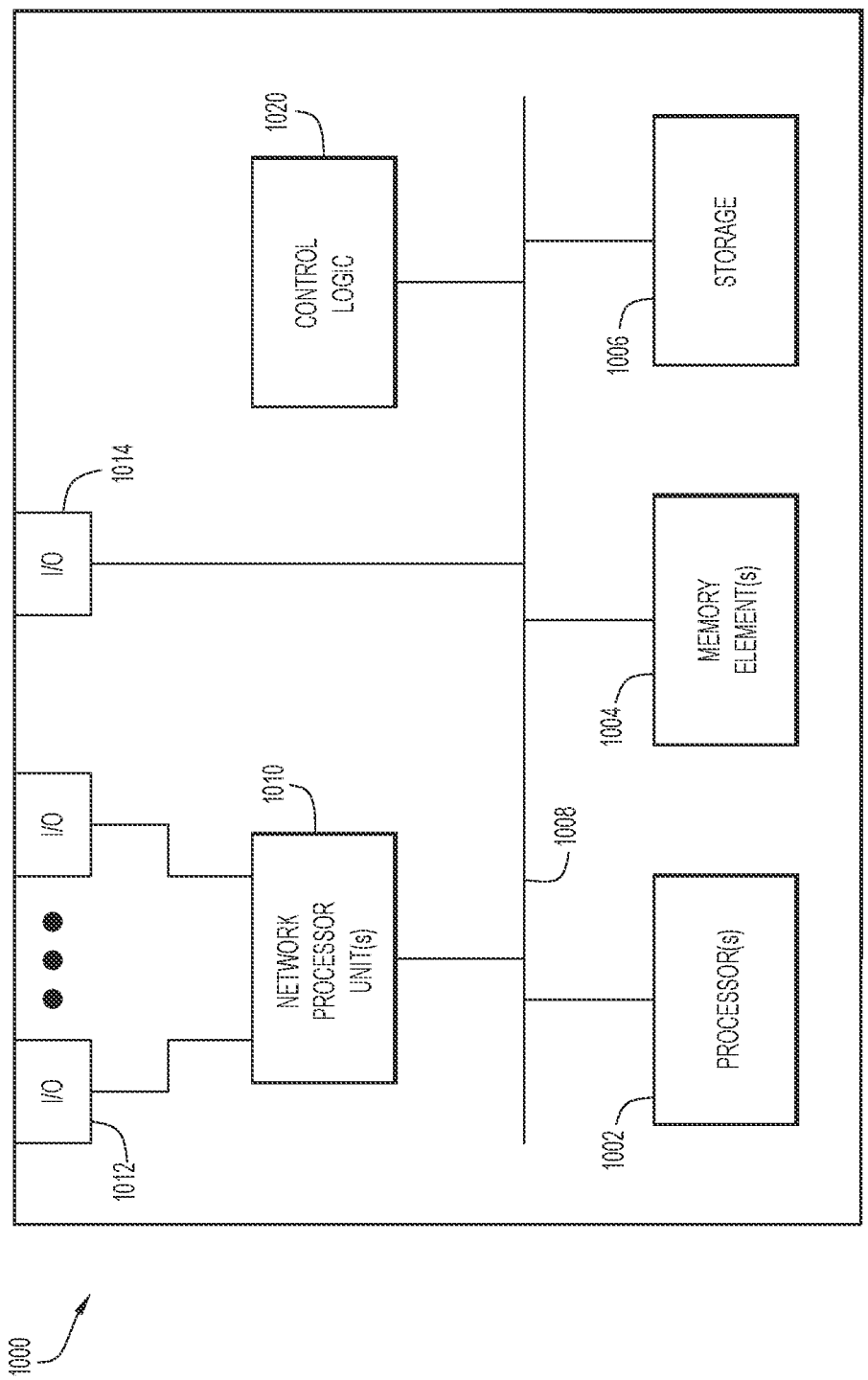
FIG. 10 is a block diagram of a computing device that may be configured to perform the techniques presented herein, according to an example embodiment.

Referring to FIG. 10, FIG. 10 illustrates a hardware block diagram of a computing device 1000 that may perform functions associated with operations discussed herein in connection with the techniques depicted in FIGS. 1, 2A, 2B, 2C, and 3-9. In various embodiments, a computing device, such as computing device 1000 or any combination of computing devices 1000, may be configured as any entity/entities as discussed for the techniques depicted in connection with FIGS. 1, 2A, 2B, 2C, and 3-9 in order to perform operations of the various techniques discussed herein.

In at least one embodiment, the computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computing device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein leverage multi-path communication to enable session persistence across MAC address changes by a wireless device. A wireless device that is configured to change MAC addresses (e.g., through an RCM rotation) uses a make-before-break transition with subflows of a multi-path communication session to ensure that any data sessions persist through the MAC address change, regardless of whether the MAC address change occurs within or between IEEE 802.11 sessions. The network controller and the network infrastructure enable additional features in support of the session persistence, including a seamless session context transfer, multi-path proxying for legacy peer devices, and proxying correlated flows for quick re-establishment of correlated flows after a MAC address change.

In some aspects, the techniques described herein relate to a method including: establishing a multi-path communication session for a user device on a wireless network, the multi-path communication session including at least one first subflow associated with a first Media Access Control (MAC) address of the user device; determining that the user device changes from the first MAC address to a second MAC address; establishing at least one second subflow of the multi-path communication session, the second subflow associated with the second MAC address; and after establishing the at least one second subflow associated with the second MAC address, ending the at least one first subflow associated with the first MAC address.

In some aspects, the techniques described herein relate to a method, wherein establishing the at least one first subflow includes establishing a first virtual interface associated with the first MAC address at a data link layer of the user device, the first virtual interface causing the user device to obtain a first Internet Protocol (IP) address for the at least one first subflow.

In some aspects, the techniques described herein relate to a method, wherein establishing the at least one second subflow includes establishing a second virtual interface associated with the second MAC address at the data link layer of the user device, the second virtual interface causing the user device to obtain a second IP address for the at least one second subflow.

In some aspects, the techniques described herein relate to a method, wherein ending the at least one first subflow includes waiting for an expiration of a timer associated with the at least one first subflow.

In some aspects, the techniques described herein relate to a method, wherein establishing the at least one first subflow includes associating with a first access point of the wireless network, and wherein establishing the at least one second subflow includes associating with a second access point of the wireless network different from the first access point.

In some aspects, the techniques described herein relate to a method, further including providing an identifier to an access point of the wireless network, the identifier identifying a plurality of correlated flows including the at least one first subflow, wherein establishing the at least one second subflow includes providing the identifier to the access point, enabling the access point to provide the plurality of correlated flows in the at least one second subflow.

In some aspects, the techniques described herein relate to a method, wherein the identifier includes a set of network policies for the plurality of correlated flows.

In some aspects, the techniques described herein relate to an apparatus including: a wireless network interface configured to communicate with one or more devices through a computer network; and a processor coupled to the wireless network interface, the processor configured to: establish a multi-path communication session on the wireless network, the multi-path communication session including at least one first subflow associated with a first Media Access Control (MAC) address of the apparatus; determine that the apparatus changes from the first MAC address to a second MAC address; establish at least one second subflow of the multi-path communication session, the second subflow associated with the second MAC address; and after the network device establishes the at least one second subflow associated with the second MAC address, ending the at least one first subflow associated with the first MAC address.

In some aspects, the techniques described herein relate to an apparatus, wherein the processor is configured to establish the at least one first subflow by establishing a first virtual interface associated with the first MAC address at a data link layer, the first virtual interface causing the wireless network interface to obtain a first Internet Protocol (IP) address for the at least one first subflow.

In some aspects, the techniques described herein relate to an apparatus, wherein the processor is configured to establish the at least one second subflow by establishing a second virtual interface associated with the second MAC address at the data link layer, the second virtual interface causing the wireless network interface to obtain a second IP address for the at least one second subflow.

In some aspects, the techniques described herein relate to an apparatus, wherein the processor is configured to end the at least one first subflow by waiting for an expiration of a timer associated with the at least one first subflow.

In some aspects, the techniques described herein relate to an apparatus, wherein the processor is configured to establish the at least one first subflow by causing the wireless network interface to associate with a first access point of the wireless network, and wherein the processor is configured to establish the at least one second subflow by causing the wireless network interface to associate with a second access point of the wireless network different from the first access point.

In some aspects, the techniques described herein relate to an apparatus, wherein the processor is further configured to: cause the wireless network interface to provide an identifier to an access point of the wireless network, the identifier identifying a plurality of correlated flows including the at least one first subflow, wherein the processor is configured to establish the at least one second subflow by causing the causing the wireless network interface to provide the identifier to the access point, enabling the access point to provide the plurality of correlated flows in the at least one second subflow.

In some aspects, the techniques described herein relate to an apparatus, wherein the identifier includes a set of network policies for the plurality of correlated flows.

In some aspects, the techniques described herein relate to one or more non-transitory computer readable storage media encoded with software including computer executable instructions that, when the software is executed on a user device, is operable to cause a processor of the user device to: establish a multi-path communication session for the user device on a wireless network, the multi-path communication session including at least one first subflow associated with a first Media Access Control (MAC) address of the user device; determine that the user device changes from the first MAC address to a second MAC address; establish at least one second subflow of the multi-path communication session, the second subflow associated with the second MAC address; and after establishing the at least one second subflow associated with the second MAC address, end the at least one first subflow associated with the first MAC address.

In some aspects, the techniques described herein relate to one or more non-transitory computer readable storage media, wherein the software is further operable to cause the processor to establish the at least one first subflow by establishing a first virtual interface associated with the first MAC address at a data link layer of the user device, the first virtual interface causing the user device to obtain a first Internet Protocol (IP) address for the at least one first subflow.

In some aspects, the techniques described herein relate to one or more non-transitory computer readable storage media, wherein the software is further operable to cause the processor to establish the at least one second subflow by establishing a second virtual interface associated with the second MAC address at the data link layer of the user device, the second virtual interface causing the user device to obtain a second IP address for the at least one second subflow.

In some aspects, the techniques described herein relate to one or more non-transitory computer readable storage media, wherein the software is further operable to cause the processor to end the at least one first subflow by waiting for an expiration of a timer associated with the at least one first subflow.

In some aspects, the techniques described herein relate to one or more non-transitory computer readable storage media, wherein the software is further operable to cause the processor to establish the at least one first subflow by associating the user device with a first access point of the wireless network, and wherein the software is further operable to cause the processor to establish the at least one second subflow includes associating the user device with a second access point of the wireless network different from the first access point.

In some aspects, the techniques described herein relate to one or more non-transitory computer readable storage media, wherein the software is further operable to cause the processor to provide an identifier to an access point of the wireless network, the identifier identifying a plurality of correlated flows including the at least one first subflow, wherein the software is further operable to cause the processor to establish the at least one second subflow by providing the identifier to the access point, enabling the access point to provide the plurality of correlated flows in the at least one second subflow.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    establishing a multi-path communication session for a user device on a wireless network, the multi-path communication session including at least one first subflow associated with a first Media Access Control (MAC) address of the user device;
    determining that the user device changes from the first MAC address to a second MAC address from a communication transmitted by the user device over the wireless network, wherein the communication comprises the second MAC address;
    establishing at least one second subflow of the multi-path communication session, the at least second subflow associated with the second MAC address; and
    after establishing the at least one second subflow associated with the second MAC address, ending the at least one first subflow associated with the first MAC address.

2. The method of claim 1, wherein establishing the at least one first subflow comprises establishing a first virtual interface associated with the first MAC address at a data link layer of the user device, the first virtual interface causing the user device to obtain a first Internet Protocol (IP) address for the at least one first subflow.

3. The method of claim 2, wherein establishing the at least one second subflow comprises establishing a second virtual interface associated with the second MAC address at the data link layer of the user device, the second virtual interface causing the user device to obtain a second IP address for the at least one second subflow.

4. The method of claim 1, wherein ending the at least one first subflow comprises waiting for an expiration of a timer associated with the at least one first subflow.

5. The method of claim 1, wherein establishing the at least one first subflow includes associating with a first access point of the wireless network, and wherein establishing the at least one second subflow includes associating with a second access point of the wireless network different from the first access point.

6. The method of claim 1, further comprising providing an identifier to an access point of the wireless network, the identifier identifying a plurality of correlated flows including the at least one first subflow, wherein establishing the at least one second subflow comprises providing the identifier to the access point, enabling the access point to provide the plurality of correlated flows in the at least one second subflow.

7. The method of claim 6, wherein the identifier includes a set of network policies for the plurality of correlated flows.

8. An apparatus comprising:
    a wireless network interface configured to communicate with one or more devices through a wireless network; and
    a processor coupled to the wireless network interface, the processor configured to:
        establish a multi-path communication session on the wireless network, the multi-path communication session including at least one first subflow associated with a first Media Access Control (MAC) address of the apparatus;
        determine that the apparatus changes from the first MAC address to a second MAC address from a communication transmitted by the apparatus over the wireless network, wherein the communication comprises the second MAC address;
        establish at least one second subflow of the multi-path communication session, the at least one second subflow associated with the second MAC address; and
        after the network device establishes the at least one second subflow associated with the second MAC address, ending the at least one first subflow associated with the first MAC address.

9. The apparatus of claim 8, wherein the processor is configured to establish the at least one first subflow by establishing a first virtual interface associated with the first MAC address at a data link layer, the first virtual interface causing the wireless network interface to obtain a first Internet Protocol (IP) address for the at least one first subflow.

10. The apparatus of claim 9, wherein the processor is configured to establish the at least one second subflow by establishing a second virtual interface associated with the second MAC address at the data link layer, the second virtual interface causing the wireless network interface to obtain a second IP address for the at least one second subflow.

11. The apparatus of claim 8, wherein the processor is configured to end the at least one first subflow by waiting for an expiration of a timer associated with the at least one first subflow.

12. The apparatus of claim 8, wherein the processor is configured to establish the at least one first subflow by causing the wireless network interface to associate with a first access point of the wireless network, and wherein the processor is configured to establish the at least one second subflow by causing the wireless network interface to associate with a second access point of the wireless network different from the first access point.

13. The apparatus of claim 8, wherein the processor is further configured to:
    cause the wireless network interface to provide an identifier to an access point of the wireless network, the identifier identifying a plurality of correlated flows including the at least one first subflow, wherein the processor is configured to establish the at least one second subflow by causing the wireless network interface to provide the identifier to the access point, enabling the access point to provide the plurality of correlated flows in the at least one second subflow.

14. The apparatus of claim 13, wherein the identifier includes a set of network policies for the plurality of correlated flows.

15. One or more non-transitory computer readable storage media encoded with software comprising computer executable instructions that, when the software is executed on a user device, is operable to cause a processor of the user device to:
    establish a multi-path communication session for the user device on a wireless network, the multi-path communication session including at least one first subflow associated with a first Media Access Control (MAC) address of the user device;
    determine that the user device changes from the first MAC address to a second MAC address from a communication transmitted by the user device over the wireless network, wherein the communication comprises the second MAC address;

establish at least one second subflow of the multi-path communication session, the at least one second subflow associated with the second MAC address; and after establishing the at least one second subflow associated with the second MAC address, end the at least one first subflow associated with the first MAC address.

16. The one or more non-transitory computer readable storage media of claim 15, wherein the software is further operable to cause the processor to establish the at least one first subflow by establishing a first virtual interface associated with the first MAC address at a data link layer of the user device, the first virtual interface causing the user device to obtain a first Internet Protocol (IP) address for the at least one first subflow.

17. The one or more non-transitory computer readable storage media of claim 16, wherein the software is further operable to cause the processor to establish the at least one second subflow by establishing a second virtual interface associated with the second MAC address at the data link layer of the user device, the second virtual interface causing the user device to obtain a second IP address for the at least one second subflow.

18. The one or more non-transitory computer readable storage media of claim 15, wherein the software is further operable to cause the processor to end the at least one first subflow by waiting for an expiration of a timer associated with the at least one first subflow.

19. The one or more non-transitory computer readable storage media of claim 15, wherein the software is further operable to cause the processor to establish the at least one first subflow by associating the user device with a first access point of the wireless network, and wherein the software is further operable to cause the processor to establish the at least one second subflow includes associating the user device with a second access point of the wireless network different from the first access point.

20. The one or more non-transitory computer readable storage media of claim 15, wherein the software is further operable to cause the processor to provide an identifier to an access point of the wireless network, the identifier identifying a plurality of correlated flows including the at least one first subflow, wherein the software is further operable to cause the processor to establish the at least one second subflow by providing the identifier to the access point, enabling the access point to provide the plurality of correlated flows in the at least one second subflow.

21. The method of claim 1, wherein after establishing the at least one second subflow, further comprising transferring the multi-path communication session from the at least one first subflow to the at least one second subflow using a transfer session context.

22. The method of claim 1, wherein the multi-path communication session that includes the at least one second subflow does not contain one or more data segments from the multi-path communication session that includes the at least one first subflow.

* * * * *